US010887216B2

(12) United States Patent
Raj et al.

(10) Patent No.: US 10,887,216 B2
(45) Date of Patent: Jan. 5, 2021

(54) MANAGING DEFAULT ROUTE ADVERTISEMENTS BY AN AREA BORDER ROUTER IN AN OPEN SHORTEST PATH FIRST NETWORK

(71) Applicant: HEWLETT PACKARD ENTERPRISE DEVELOPMENT LP, Houston, TX (US)

(72) Inventors: Anil Raj, Bangalore (IN); Srijith Ponnappan, Bangalore (IN); Sasikumar Balasubramanian, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/273,487

(22) Filed: Feb. 12, 2019

(65) Prior Publication Data
US 2020/0259733 A1    Aug. 13, 2020

(51) Int. Cl.
*H04L 12/751* (2013.01)
*H04L 12/707* (2013.01)
*H04L 12/715* (2013.01)
*H04L 12/721* (2013.01)

(52) U.S. Cl.
CPC ............ *H04L 45/02* (2013.01); *H04L 45/04* (2013.01); *H04L 45/12* (2013.01); *H04L 45/22* (2013.01)

(58) Field of Classification Search
None
See application file for complete search history.

(56) References Cited

U.S. PATENT DOCUMENTS 7,876,700 B2    1/2011  Pacella
9,071,503 B2 *  6/2015  Moore .................... H04L 45/04
9,503,357 B2    11/2016 Lindem et al.
2003/0014540 A1 * 1/2003 Sultan .................... H04L 45/02
                                                     709/240
2009/0073994 A1 * 3/2009 Qureshi ............ H04L 29/12792
                                                     370/401

OTHER PUBLICATIONS

Alcatel., "OmniSwitch 6600 Family Advanced Routing Configuration Guide," Mar. 2005, http://support.alcadis.nl/files/get_file?file=Alcatel-Lucent%252FOmniSwitch%252FOS6850%2B-%28EOS%252FManuals%252FOS6850%2BAOS%2B6.4.4%28R01%252FOS6850%2BAOS%2B6.4.4%2BR01%2BAdvanced%2BRouting%2BGuide.pdf.
Hamalawy, S. E., "OSPF Default Route Cost," Oct. 12, 2013, http://switchpacket.blogspot.com/2013/10/ospf-default-route-cost.html.
Hewlett Packard Enterprise Support Center, "HP a Series Switches—OSPF ABR Does Not Generate Default Route to Stub Area When Backbone Connection is Down," retrieved online Jan. 14, 2019, https://support.hpe.com/hpsc/doc/public/display?docId=emr_na-c03639576.
Teare, D. et al,, "OSPF Implementation," Feb. 3, 2015, http://www.ciscopress.com/articles/article.asp?p=2294214&seqNum=3.
J. Moy, "OSPF Version 2", RFC 2328, Apr. 1998, pp. 1-244.

* cited by examiner

*Primary Examiner* — Anh Ngoc M Nguyen
(74) *Attorney, Agent, or Firm* — Hewlett Packard Enterprise Patent Department

(57) ABSTRACT

Examples disclosed herein relate to management of default route advertisement by an Area Border Router in an OSPF network. In an example, an ABR in an OSPF network may determine whether a pre-condition for the ABR to advertise a default route to a stub area is met. In response to a determination that the pre-condition for the ABR to advertise the default route to the stub area is met, the ABR may advertise the default route to an adjacent router in the stub area.

20 Claims, 5 Drawing Sheets

MANAGING DEFAULT ROUTE ADVERTISEMENTS BY AN AREA BORDER ROUTER IN AN OPEN SHORTEST PATH FIRST NETWORK

BACKGROUND

Routing protocols have evolved over the years to match the growing complexity of computer networks. Routing protocols specify how routers in a computer network communicate and share information with each other. Routing protocols allow routers to dynamically learn about routes that may exist on a network, build routing tables and perform routing decisions. Open Shortest Path First (OSPF) is an example of a routing protocol.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
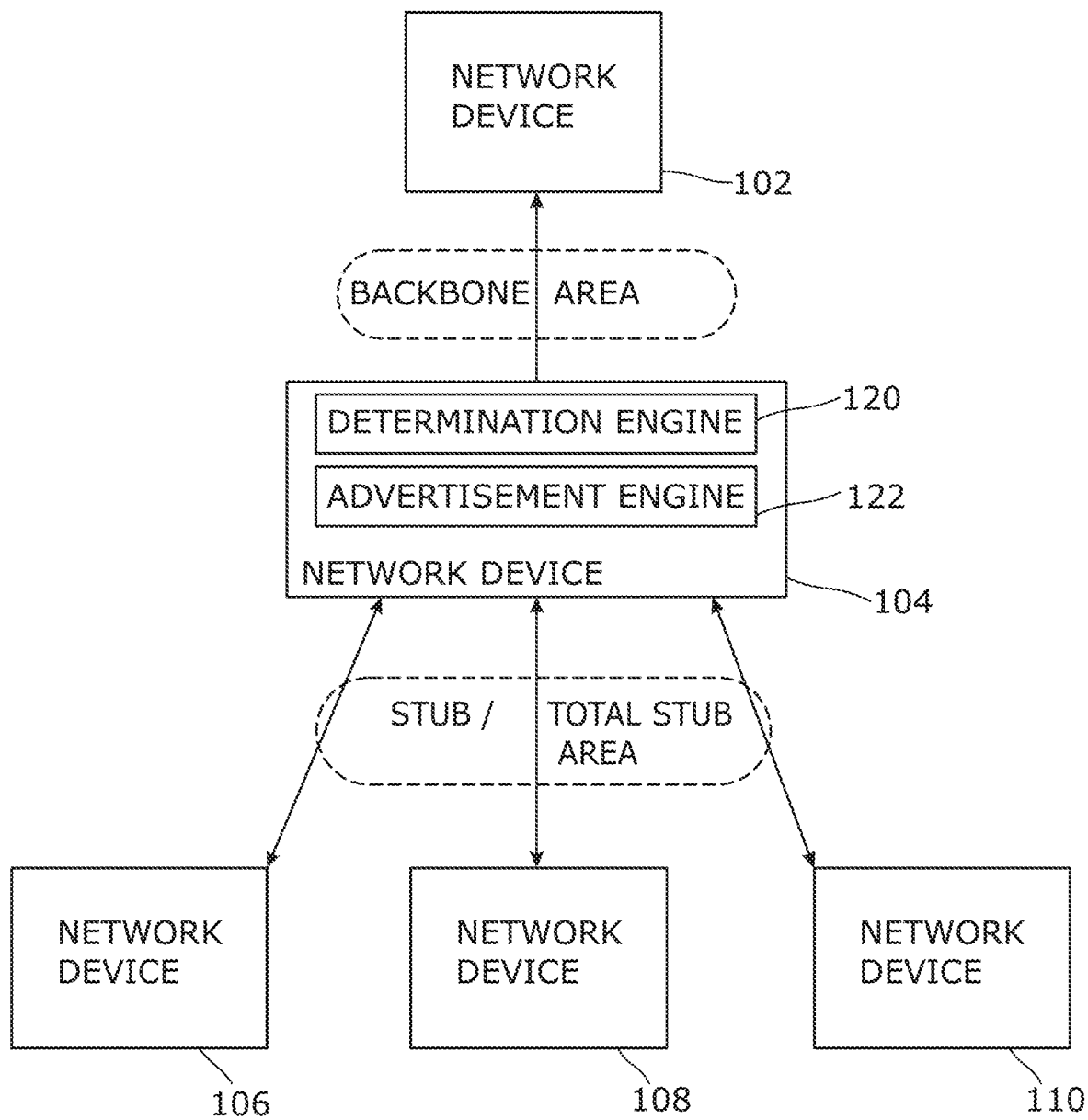
FIG. 1 is a block diagram of an example computing environment for managing default route advertisements by an Area Border Router in an Open Shortest Path First network.

Dynamic routing protocol enables routers to dynamically discover and maintain routes in routing tables, exchange routing updates with other routers, identify the best path to a destination network, and share a same network topology map with other routers in a network. According to one classification, dynamic routing protocols may be classified into two types: Interior Gateway Protocol (IGP) or Exterior Gateway Protocol (EGP). Interior Gateway Protocols (IGP) are used for routing within an autonomous system (AS). An autonomous system (AS) may be defined as a collection of routers under a common administration, for example a company or an organization. Examples of an IGP may include EIGRP, OSPF, and IS-IS. Exterior Gateway Protocols (EGP) are used for routing between autonomous systems. An example of EGP includes the Border Gateway Protocol (BGP). According to one classification, Interior Gateway Protocol (IGP) may be classified into two types: distance vector protocol and link state protocol. Examples of link state routing protocols include Open Shortest Path First (OSPF) and Intermediate System to Intermediate System (IS-IS).

An OSPF network may subdivided into routing areas to simplify administration and optimize traffic. An area includes its connecting router having interfaces connected to the network. Each area maintains a separate link state database whose information may be summarized towards the rest of the network by the connecting router. Thus, the topology of an area is unknown outside the area. This reduces the routing traffic between parts of an autonomous system. Areas may be identified by 32-bit numbers, expressed either simply in decimal. By convention, area 0 (zero), or 0.0.0.0, represents the core or backbone area of an OSPF network. Each additional area may have a connection to the OSPF backbone area. Such connections are maintained by an interconnecting router, known as an Area Border Router (ABR). An ABR maintains separate link-state databases for each area it serves and maintains summarized routes for all areas in the network.

The OSPF Area Border Router (ABR) advertises only the default route to a stub (or a total stub router) to avoid the routing table updates on the stub (or total stub router). The OSPF router becomes ABR when it has any interface configured on the backbone area (area 0) and starts advertising the default route to a stub (or total stub router). In order to become an ABR, the OSPF router simply checks if there is any area 0 interface in an "UP state" and it does not require a neighborship to the backbone router to be established. If a remote link failure occurs between an ABR and the backbone routes, the ABR does not have any routing information to reach beyond the backbone network. The OSPF ABR router still continues to advertise the default route to a stub (or total stub router) as the local OSPF interface link state is "UP". In such case, although stub router may keep sending network traffic to the ABR, all of it gets dropped at the ABR.

To address these technical challenges, the present disclosure describes various examples for managing default route advertisements by an Area Border Router in an OSPF network. In an example, the technical challenges may be addressed by programming the ABR to advertise the default-route to an adjacent stub (or a total stub router) upon satisfaction of a pre-defined condition.

In an example, an ABR in an OSPF network may determine whether a pre-condition for the ABR to advertise a default route to a stub area is met. In response to a determination that the pre-condition for the ABR to advertise the default route to the stub area is met, the ABR may advertise the default route to an adjacent router in the stub area. In an example, the pre-condition may include a determination whether the ABR is in an active neighborship with a backbone area in the OSPF network. In response to a determination that the ABR is not in an active neighborship with the backbone area, the ABR may cease the advertisement of the default route to an adjacent router in a stub area supported by the ABR.

FIG. 1 is a diagram of an example computing environment 100 for managing default route advertisements by an Area Border Router in an Open Shortest Path First network. Computing environment 100 may include a plurality of network devices 104, 106, 108, and 110. Although five network devices are shown in FIG. 1, other examples of this disclosure may include more or less number of network devices.

Network devices 104, 106, 108, and 110 may be communicatively coupled via a computer network. Computer network may be a wireless or wired network. Computer network may include, for example, a Local Area Network (LAN), a Wireless Local Area Network (WAN), a Campus Area Network (CAN), or the like. Further, computer network may be a public network (for example, the Internet) or a private network (for example, an intranet). In an example, computer network may be an IP network. In another example, computer network may be an autonomous system.

An "autonomous system" (AS) may be defined as a collection of routers whose prefixes and routing policies are under a common administrative control.

Network devices 104, 106, 108, and 110 may each be, for example, a network router, a virtual router, a network switch, or a virtual switch. In an example, network devices 104, 106, 108, and 110 may each administer a dynamic routing protocol (for example, OSPF). In an example, network device 104, 106, 108, and 110 may each be an OSPF enabled router.

In an example, network device 104 may be a part of a backbone area. The backbone area (also known as area 0) forms the core of an OSPF network. All other areas are connected to it, either directly or through other routers. Inter-area routing may occur through routers connected to the backbone area and to their own associated areas. The backbone area is responsible for distributing routing information between non-backbone areas. All OSPF areas may connect to the backbone area.

Each additional area may have a connection to the OSPF backbone area. Such connections are maintained by an interconnecting router, known as an Area Border Router (ABR). In an example, network device 104 may be an ABR. An ABR may maintain separate link-state databases for each area it serves and maintain summarized routes for all areas in the network. An ABR advertises only the default route to a stub or a total stub router to avoid the routing table updates on the stub or total stub router. In an example, network devices 106, 108, and 110 may each act as a stub router or total stub router supported by the ABR 104. An OSPF router (e.g., 104) may become an ABR if has any interface configured on the backbone area (area 0) and starts advertising the default route to a stub or total stub router (e.g., 106, 108, and 110).

To control the advertisement of external routes into an area, OSPF may use stub areas. A stub area is an area which does not receive route advertisements external to an autonomous system and routing from within the area is based entirely on a default route. By designating an ABR interface to the area as a stub interface, external route advertisements may be suppressed through the ABR. The ABR advertises a default route in place of the external routes and generates network summary (Type 3) link-state advertisements (LSAs). The ABR (e.g., 104) may delete type 4, 5 LSAs from internal routers, and send them a default route of 0.0.0.0.

A stub area that only allows routes internal to the area and restricts Type 3 LSAs from entering the stub area may be called a total stub area. The ABR only advertises and allows the default route to enter into the area. External routes and destinations to other areas are not summarized or allowed into a total stub area.

Each network device 104, 106, 108, and 110 may establish neighbor relationship with other network devices in the same area or different areas of network. Each network device 104, 106, 108, and 110 may receive route update information from its neighbors. In an example, route update information may be received through a flooding process. For instance, network device 104 may receive route update information from its neighbor network devices 106, 108, and 110.

In an example, network device 104 may be an Area Border Router. In an example, network device 104 may include a determination engine 120 and an advertisement engine 122.

Engines 120 and 122 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of network device 104. In some examples, the at least one machine-readable storage medium may store instructions that, when executed by the at least one processing resource, at least partially implement some or all engines of network device 104. In such examples, network device 104 may include the at least one machine-readable storage medium storing the instructions and the at least one processing resource to execute the instructions.

In an example, determination engine 120 on network device 104, which may be an Area Border Router (ABR) in an Open Shortest Path First (OSPF) network, may determine whether a pre-condition for the ABR to advertise a default route to a stub area is met. In an example, network devices 106, 108, and 108 may each be a router in a stub area supported by ABR 104. A stub area is an area which does not receive route advertisements external to an autonomous system and routing from within the area is based entirely on a default route. Typically, by designating an ABR interface to the area as a stub interface, external route advertisements may be suppressed through an ABR. An ABR may advertise a default route in place of the external routes and generate network summary (Type 3) link-state advertisements (LSAs).

In an example, network devices 106, 108, and 108 may each be a router in a total stub area supported by ABR 104. A stub area that only allows routes internal to the area and restricts Type 3 LSAs from entering the stub area may be called a total stub area. Typically, an ABR may only advertise and allow a default route to enter into the area. External routes and destinations to other areas are not summarized or allowed into a total stub area.

In a present example, prior to sending a default route to a stub area (or a total stub area), determination engine 120 on ABR 104 may determine whether a pre-condition for the ABR 104 to advertise a default route to a stub area (or a total stub area) is met. In response to a determination that the pre-condition for the ABR to advertise a default route to the stub area is met, advertisement engine 122 on the ABR 104 may advertise the default route to an adjacent router in the stub area.

In an example, the pre-condition may include the ABR to be in an active neighborship with a backbone area in the OSPF network. In such case, determination engine 120 may determine whether the ABR is in an active neighborship with a backbone area in the OSPF network. In an example, network device 102 may represent a router in the backbone area, and determination engine may determine whether the ABR 104 is in an active neighborship with an OSPF neighbor (e.g., network device 102) from the backbone area.

In an example, in order to determine whether the ABR 104 is in an active neighborship with an OSPF neighbor (e.g., network device 102) from the backbone area, determination engine 120 may determine whether the OSPF neighbor from the backbone area is present in a neighbor table maintained by the ABR. A neighbor table may be used to maintain a neighbor state information of a device in an OSPF area. The neighbor table may be used to determine if there is an addition, removal, or modification of information related to an OSPF neighbor in an OSPF area.

In an example, if determination engine 120 on ABR 104 detects that an OSPF neighbor (e.g., 102) available in its neighbor table for area zero (area 0), it may determine that there is active neighborship on the backbone area. In such case since the pre-condition has been met, advertisement engine 122 on the ABR 104 may advertise the default route to an adjacent router in the stub area (or total stub area).

In an example, if determination engine 120 on ABR 104 detects that there is no OSPF neighbor available in its neighbor table for area zero (area 0), it may determine that there is no active neighborship on the backbone area. In such case since the pre-condition is not met, advertisement engine 122 on the ABR 104 may cease the advertisement of the default route to an adjacent router in the stub area (or total stub area).

In another example, the pre-condition may be whether the ABR 104 includes a loopback interface in an UP state in the backbone area of the OSPF network. The loopback interface may include an interface with an IP address which never goes down. In this state, the ABR's interface may be looped back to the network in hardware or software. In this state, the interface may be unavailable for regular data traffic. A loopback interface may be a virtual interface that is always up and reachable as long as at least one of the IP interfaces on the ABR is operational.

In response to a determination by determination engine 120 that the ABR 104 includes a loopback interface in an UP state in the backbone area of the OSPF network, the ABR 104 may cease advertisement of the default route to an adjacent router in a stub area (or a total stub area).

In a further example, the pre-condition may be whether the ABR 104 includes a passive interface in an UP state in the backbone area of the OSPF network. A passive interface may be used to disable sending updates out from a specific interface. In OSPF the passive interface may be used to suppress hello packets and hence neighbor relationships. In response to a determination by determination engine 120 that the ABR 104 includes a passive interface in an UP state in the backbone area of the OSPF network, the ABR 104 may cease advertisement of the default route to an adjacent router in the stub area (or a total stub area).

In a yet another example, the pre-condition may include presence of an inter-area Link State Advertisement (LSA) on the ABR 104 to suppress towards an adjacent router in a stub area (or a total stub area). In response to a determination by determination engine 120 that an inter-area LSA to suppress towards a router in the stub area is present on the ABR 104, the ABR 104 may advertise the default route to the adjacent router in the stub area. However, in response to a determination that an inter-area LSA to suppress towards the router in the stub area is not present on the ABR 104, the ABR 104 may cease the advertisement of the default route to the adjacent router in the stub area (or a total stub area).

In a further example, the pre-condition may include presence of an external LSA on the ABR 104 to suppress towards the router in the stub area. In response to a determination that the external LSA to suppress towards a router in the stub area is present on the ABR 104, the ABR 104 may advertise the advertisement of the default route to the adjacent router in a stub area (or a total stub area). However, in response to a determination that the external LSA to suppress towards the router in the stub area is not present on the ABR 104, the ABR 104 may cease the advertisement of the default route to the adjacent router in a stub area (or a total stub area).

Figure 2:
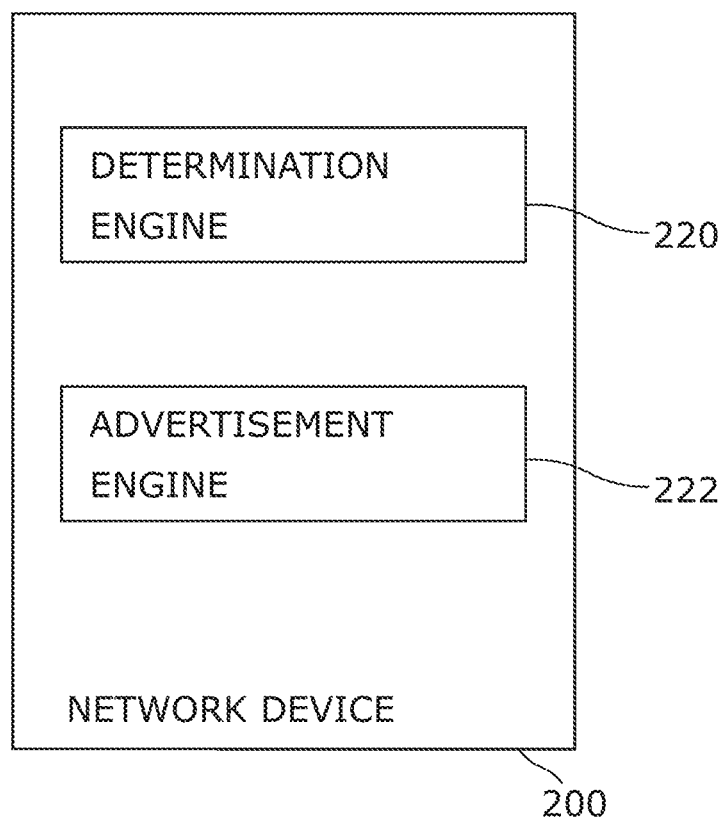
FIG. 2 is a block diagram of an example network device for managing default route advertisements in an Open Shortest Path First network.

FIG. 2 is a block diagram of an example network device 200 for managing default route advertisement in an Open Shortest Path First network.

In an example, network device 200 may be analogous to network device 104 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

Network device 200 may include, for instance, a network router, a virtual router, a network switch, a virtual switch, or any network device with routing functionality. In an example, network device 200 may be an OSPF enabled router.

In the example of FIG. 2, network device 200 may include a determination engine 220 and an advertisement engine 222. In an example, determination engine 220 and advertisement engine 222 may perform functionalities as described in respect of determination engine 120 and advertisement engine 122 of FIG. 1.

In an example, network device 200 may be an ABR. In such case, determination engine 220 may determine whether a pre-condition for the ABR to advertise a default route to a stub area (or a total stub area) is met. In response to a determination that the pre-condition for the ABR to advertise the default route to the router in the stub area is met, advertisement engine 222 may advertise the default route to an adjacent router in the stub area (or total stub area).

Figure 3:
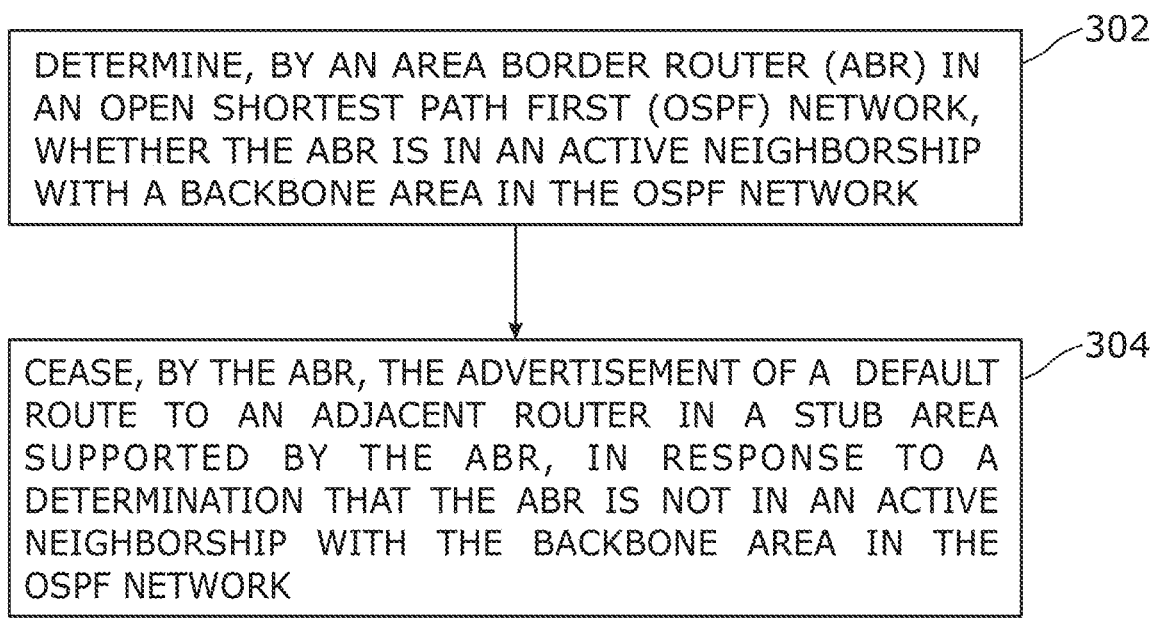
FIG. 3 is a block diagram of an example method of managing default route advertisements by an Area Border Router in an Open Shortest Path First network.

FIG. 3 is a block diagram of an example method 300 of managing default route advertisements by an Area Border Router in an Open Shortest Path First network. The method 300, which is described below, may be partially executed on a computing device such as network device 104 of FIG. 1 or network device 200 of FIG. 2. However, other suitable network devices may execute method 300 as well. At block 302, a determination may be made by an Area Border Router (e.g., 104) in an OSPF network, whether the ABR is in an active neighborship with a backbone area in the OSPF network. At block 304, in response to a determination that the ABR is not in an active neighborship with the backbone area in the OSPF network, the ABR may cease the advertisement of a default route to an adjacent router in a stub area (or total stub area) supported by the ABR.

Figure 4:
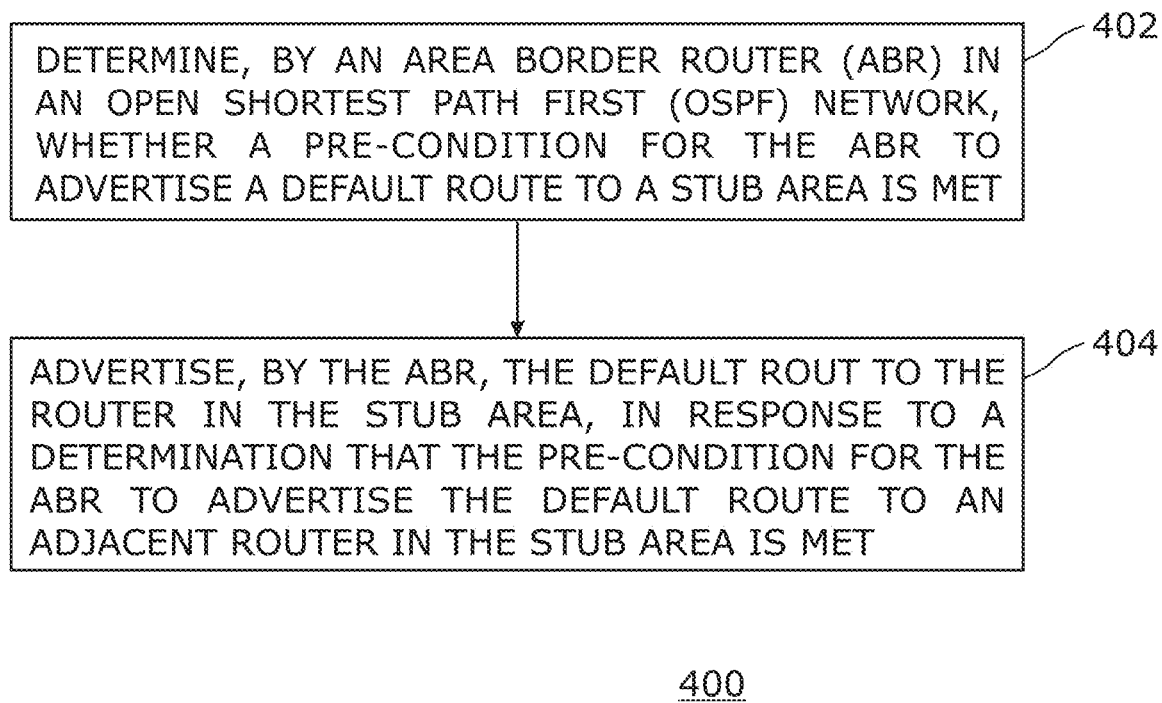
FIG. 4 is a block diagram of an example method of managing default route advertisements by an Area Border Router in an Open Shortest Path First network.

FIG. 4 is a block diagram of an example method 300 of managing default route advertisements by an Area Border Router in an Open Shortest Path First network. The method 400, which is described below, may be partially executed on a computing device such as network device 104 of FIG. 1 or network device 200 of FIG. 2. However, other suitable network devices may execute method 400 as well. At block 402, a determination may be made by an Area Border Router (e.g., 104) in an OSPF network, whether a pre-condition for the ABR to advertise a default route to a stub area is met. At block 404, in response to a determination that the pre-condition for the ABR to advertise the default route to the stub area is met, the ABR may advertise the default route to an adjacent router in the stub area.

Figure 5:
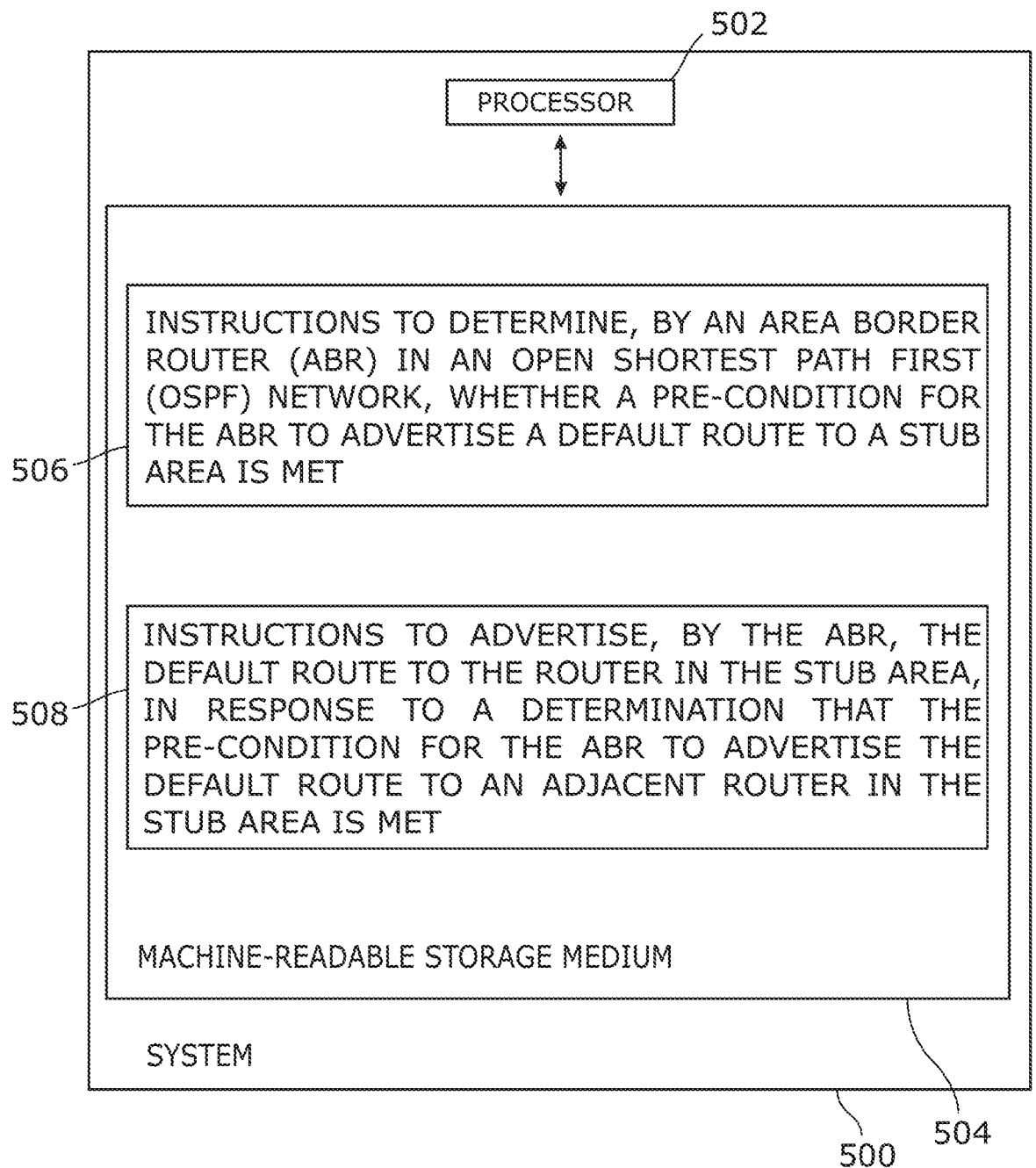
FIG. 5 is a block diagram of an example system including instructions in a machine-readable storage medium for managing default route advertisements by an Area Border Router in an Open Shortest Path First network.

FIG. 5 is a block diagram of an example system including instructions in a machine-readable storage medium for managing default route advertisements by an Area Border Router in an Open Shortest Path First network. System 500 includes a processor 502 and a machine-readable storage medium 504 communicatively coupled through a system bus. In an example, system 500 may be analogous to network device 104 of FIG. 1, and network device 200 of FIG. 2. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506 and 508. In an example, instructions 506 may be executed by processor 502 to determine, by an ABR in an OSPF network, whether a pre-condition for the ABR to advertise a default route to a stub area is met. Instructions 508 may be executed by processor 502 to advertise, in response to a determination that the pre-condition for the ABR to advertise the default route to the stub area is met, the default route to an adjacent router in the stub area. In an example, machine-readable storage medium 504 may store further instructions to program the pre-condition on the ABR.

For the purpose of simplicity of explanation, the example methods of FIGS. 3 and 4 are shown as executing serially, however it is to be understood and appreciated that the present and other examples are not limited by the illustrated order. The example systems of FIGS. 1, 2 and 5, and methods of FIGS. 3 and 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method, comprising:
   determining, by an Area Border Router (ABR) in an Open Shortest Path First (OSPF) network, whether the ABR is in an active neighborship with a backbone area in the OSPF network; and
   in response to a determination that the ABR is not in an active neighborship with the backbone area in the OSPF network, ceasing, by the ABR, the advertisement of a default route to an adjacent router in a stub area supported by the ABR.

2. The method of claim 1, wherein determining comprises:
   determining whether an OSPF neighbor from the backbone area is present in a neighbor table maintained by the ABR; and
   in response to a determination that no OSPF neighbor from the backbone area is present in the neighbor table maintained by the ABR, determining that the ABR is not in an active neighborship with the backbone area.

3. A method, comprising:
   determining, by an Area Border Router (ABR) in an Open Shortest Path First (OSPF) network, whether a pre-condition for the ABR to advertise a default route to a stub area is met; and
   in response to a determination that the pre-condition for the ABR to advertise the default route to the stub area is met, advertising, by the ABR; the default route to an adjacent router in the stub area.

4. The method of claim 3, wherein the pre-condition includes the ABR to be in an active neighborship with a backbone area in the OSPF network.

5. The method of claim 4, further comprising:
   in response to a determination that the ABR is not in an active neighborship with the backbone area in the OSPF network, ceasing, by the ABR, the advertisement of the default route to the adjacent router in the stub area.

6. The method of claim 3, wherein the pre-condition comprises whether the ABR includes a loopback interface in an UP state in the backbone area of the OSPF network.

7. The method of claim 6, further comprising:
   in response to a determination that the ABR includes a loopback interface in the UP state in the backbone area of the OSPF network, ceasing, by the ABR, the advertisement of the default route to the adjacent router in the stub area.

8. The method of claim 3, wherein the pre-condition comprises whether the ABR includes a passive interface in an UP state in the backbone area of the OSPF network.

9. The method of claim 8, further comprising:
   in response to a determination that the ABR includes a passive interface in the UP state in the backbone area of the OSPF network, ceasing, by the ABR, the advertisement of the default route to the adjacent router in the stub area.

10. A network device, comprising:
    a determination engine to determine, by an Area Border Router (ABR) in an Open Shortest Path First (OSPF) network, whether a pre-condition for the ABR to advertise a default route to a stub area is met; and
    an advertisement engine to, in response to a determination that the pre-condition for the ABR to advertise the default route to the stub area is met, advertise the default route to an adjacent router in the stub area.

11. The network device of claim 10, wherein the router includes a stub router.

12. The network device of claim 10, wherein the router includes a total stub router.

13. The network device of claim 10, wherein the stub area includes a total stub area.

14. A non-transitory machine-readable storage medium comprising instructions, the instructions executable by a processor to:
   determine, by an Area Border Router (ABR) in an Open Shortest Path First (OSPF) network, whether a pre-condition for the ABR to advertise a default route to a stub area is met; and
   advertise, in response to a determination that the pre-condition for the ABR to advertise the default route to the stub area is met, the default route to an adjacent router in the stub area.

15. The non-transitory storage medium of claim 14, wherein the pre-condition includes presence of an inter-area Link State Advertisement (LSA) on the ABR to suppress towards the adjacent router in the stub area.

16. The non-transitory storage medium of claim 15, further comprising instructions to:
   in response to a determination that the inter-area LSA to suppress towards the adjacent router in the stub area is not present on the ABR, cease the advertisement of the default route to the adjacent router in the stub area.

17. The non-transitory storage medium of claim 14, wherein the pre-condition includes presence of an external LSA on the ABR to suppress towards the adjacent router in the stub area.

18. The non-transitory storage medium of claim 17, further comprising instructions to:
   in response to a determination that the external LSA to suppress towards the adjacent router in the stub area is not present on the ABR, cease the advertisement of the default route to the adjacent router in the stub area.

19. The non-transitory storage medium of claim 14, further comprising instructions to program the pre-condition on the ABR.

20. The non-transitory storage medium of claim 14, wherein the ABR acts as a stub interface that suppresses external route advertisements to the stub area.

* * * * *